United States Patent [19]

Takahashi et al.

[11] Patent Number: 5,369,346
[45] Date of Patent: Nov. 29, 1994

[54] EMERGENCY STOP CONTROL SYSTEM FOR MOBILE ROBOT

[75] Inventors: Hideo Takahashi; Yukihiko Suzaki, both of Saitama, Japan

[73] Assignee: Honda Giken Kogyo Kabushiki Kaisha, Tokyo, Japan

[21] Appl. No.: 65,197

[22] Filed: May 20, 1993

[30] Foreign Application Priority Data

May 22, 1992 [JP] Japan ................... 4-155917

[51] Int. Cl.⁵ .......................... B25J 11/00; B25J 9/00
[52] U.S. Cl. .................... 318/568.17; 318/568.12; 318/568.1; 180/8.6; 180/8.1; 901/1
[58] Field of Search .............. 318/560–646, 318/139, 53–88; 901/1, 3, 5, 7, 9, 12, 13–18; 395/80–99; 364/424–426; 180/167–169, 3–9

[56] References Cited

U.S. PATENT DOCUMENTS

| | | | |
|---|---|---|---|
| 4,095,475 | 6/1978 | Buckley | 73/628 |
| 4,200,921 | 4/1980 | Buckley | 367/87 |
| 4,245,430 | 1/1981 | Hoyt | 318/587 X |
| 4,287,769 | 9/1981 | Buckley | 73/628 X |
| 4,388,495 | 6/1983 | Hitchcock | 179/1 S D |
| 4,638,445 | 1/1987 | Mattaboni | 901/1 X |
| 4,641,251 | 2/1987 | Inoue | 364/513 |
| 4,674,057 | 6/1987 | Caughman et al. | 901/46 X |
| 4,789,034 | 12/1988 | Luchinger et al. | 177/181 |
| 4,815,840 | 3/1989 | Benayad-Cherif et al. | 901/1 |
| 4,920,520 | 4/1990 | Gobel et al. | 367/99 |
| 5,209,695 | 5/1993 | Rothschild | 446/175 |
| 5,270,480 | 12/1993 | Hikawa | 84/645 |
| 5,280,622 | 1/1994 | Tino | 395/90 |

FOREIGN PATENT DOCUMENTS

| | | |
|---|---|---|
| 57-75794 | 5/1982 | Japan . |
| 63-22199 | 9/1988 | Japan . |
| 3184782 | 12/1991 | Japan . |

*Primary Examiner*—Paul Ip
*Attorney, Agent, or Firm*—Lyon & Lyon

[57] ABSTRACT

An emergency stop control system for a biped walking robot having a body and two articulated legs each connected to the body. The system has a robot controller for controlling the motion of the robot such that it walks in accordance with a predetermined gait and an emergency stop controller including an acoustic sensor (microphone). The robot operator and persons in a robot's working environment are provided with a whistle and blows it when the robot is likely to collide with them or objects. The sensor picks up the signal to pass it to a band-filter so as a frequency components of 400 Hz is passed to a later stage made up of a microcomputer. In the microcomputer, it is first checked if the signal is larger than a first reference level at an interval and a counter value is incremented if the result of checking is affirmative. Then the counter value is compared with a second reference value and if it exceeds the second reference value, the robot is ascertained to be in a stable attitude. If it is ascertained to be stable, the robot is driven to stop its locomotion.

17 Claims, 9 Drawing Sheets

EMERGENCY STOP CONTROL SYSTEM FOR MOBILE ROBOT

BACKGROUND OF THE INVENTION

1. Field of the Invention

This invention relates to an emergency stop control system for a mobile robot.

2. Description of the Prior Art

Being used to do human work, robots are frequently present in the same working environment as human beings. The robot's working environment also includes various objects, such as structures, equipment and machinery. Because of this, there is constantly a possibility of a robot colliding with humans and objects in its working environment. When such a collision occurs or is likely to occur, the robot's operations have to be stopped immediately. Technology for this purpose, i.e. robot emergency stop control technology, is set out in Japanese Laid-open Patent Publication Nos. 57(1987)-75794 and 63(1988)-221994. The former of these teaches a system which stops the robot's operation in response to an audio emergency stop command, while the later teaches a system for lowering the current through the robot's drive motors to below the current control limit value of the servo drivers so as to smoothly stop the drive motors and cushion the impact on the robot.

These prior art technologies relate to the stopping of stationary industrial robots, however. Emergency stop control of autonomous mobile robots is a wholly different matter.

SUMMARY OF THE INVENTION

An object of this invention is therefore to provide an emergency stop control system for a mobile robot which enables the robot to avoid collision with persons and objects with high reliability.

Further, if the robot is a legged mobile robot, its attitude is intrinsically unstable owing to the large changes that take place in the support polygon. The collision of such a robot with persons and objects cannot be reliably avoided simply by stopping it.

A second object of this invention is therefore to provide an emergency stop control system for a legged mobile robot which ensures the legged robot to avoid collision with persons and objects with high reliability.

For realizing this objects, the present invention provides a system for controlling an emergency stop of a mobile robot, comprising first means for detecting an emergency stop signal generated outside of the robot, second means for comparing the detected emergency stop signal with a reference value to determine if the detected emergency stop signal exceeds the reference value in magnitude and control means for driving the mobile robot to stop its motion if the detected emergency stop signal is determined to exceed the reference value in magnitude.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped walking robot as an example.

Figure 1:
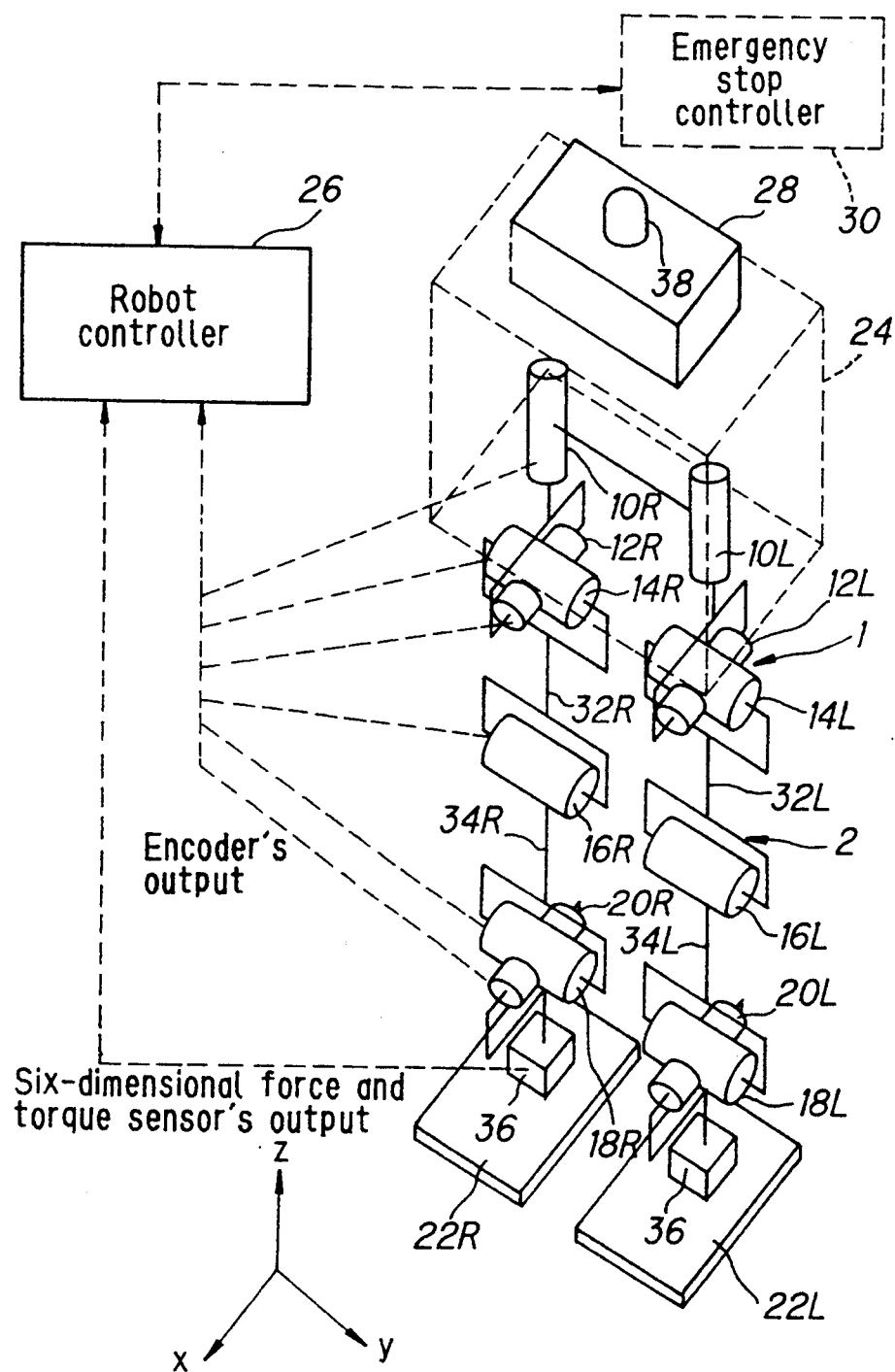
FIG. 1 is a schematic view of an emergency stop control for a mobile robot according to the invention taking a biped robot as an example of the mobile robot.

An overall skeleton view of a biped walking robot 1 is shown in FIG. 1. The robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (main unit) 24 housing a robot controller 26 is provided at the upper end. Further, a box 28 is provided at the upper end of the body 24 for housing an emergency stop controller 30 therein.

The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L. The legs 2 thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

Adjacent of the ankle joints 18, 20 R(L) of the robot 1 are equipped with conventional six-dimensional force and torque sensors 36, 36 which detect the x, y and z direction force components Fx, Fy, Fz transmitted to the robot through its feet, detect the moment components Mx, My, Mz produced about the x, y, z axes by these force components and send detection signals representing the detected force and moment components to the robot controller 26. An acoustic sensor 38 made of a microphone is installed in the aforesaid box 28 on top of the robot's main unit. The detection signal from the acoustic sensor 38 is forwarded to the emergency stop controller 30 housed in the box.

Figure 2:
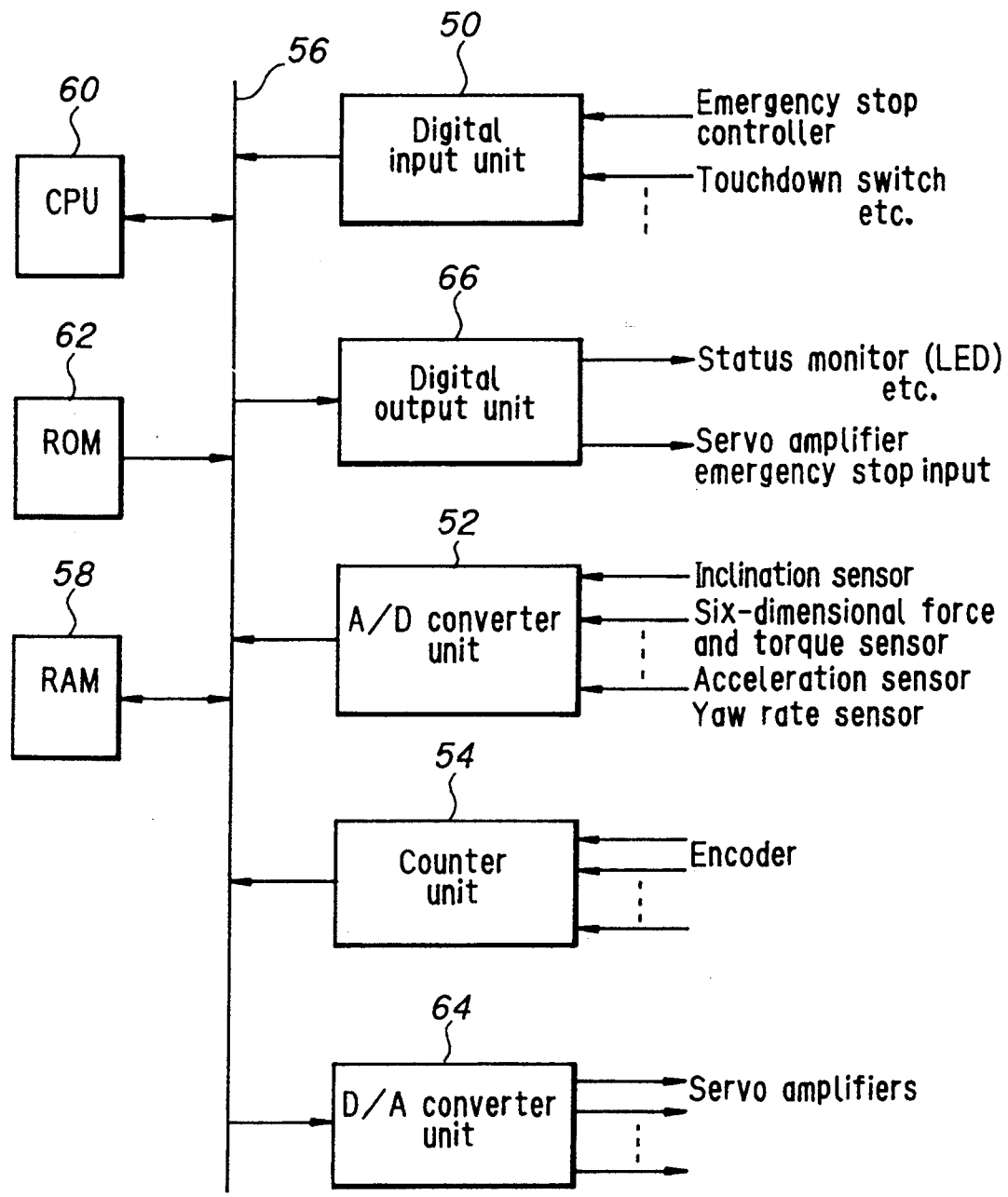
FIG. 2 is a block diagram showing the details of a robot controller illustrated in FIG. 1.

The configuration of the robot controller 26 is shown in the block diagram of FIG. 2. The robot controller 26 comprises a microcomputer and receives detection signals from a number of sensors that are not shown FIG. 1. Different ones of these detection signals are input to a digital input unit 50, an A/D convertor unit 52 and a counter unit 54, from where they are sent to a RAM (random access memory) 58 via a bus 56. A CPU (central processing unit) 60 reads a walking pattern (gait) established in advance and stored in a ROM (read only memory) 62 and calculates target joint angles therefrom. The CPU 60 further calculates errors between the calculated target joint angles and the actual joints angles detected by the encoders and stored in the RAM 58 and, determines control values required for driving the respective joint motors. The CPU 60 outputs the control values to servo amplifiers provided for the individual motors through a D/A converter unit 64 to drive the motors such that the robot walks in accordance with the established walking pattern. The CPU 60 also sends outputs to a status monitor or the like via a digital output unit 66.

Figure 3:
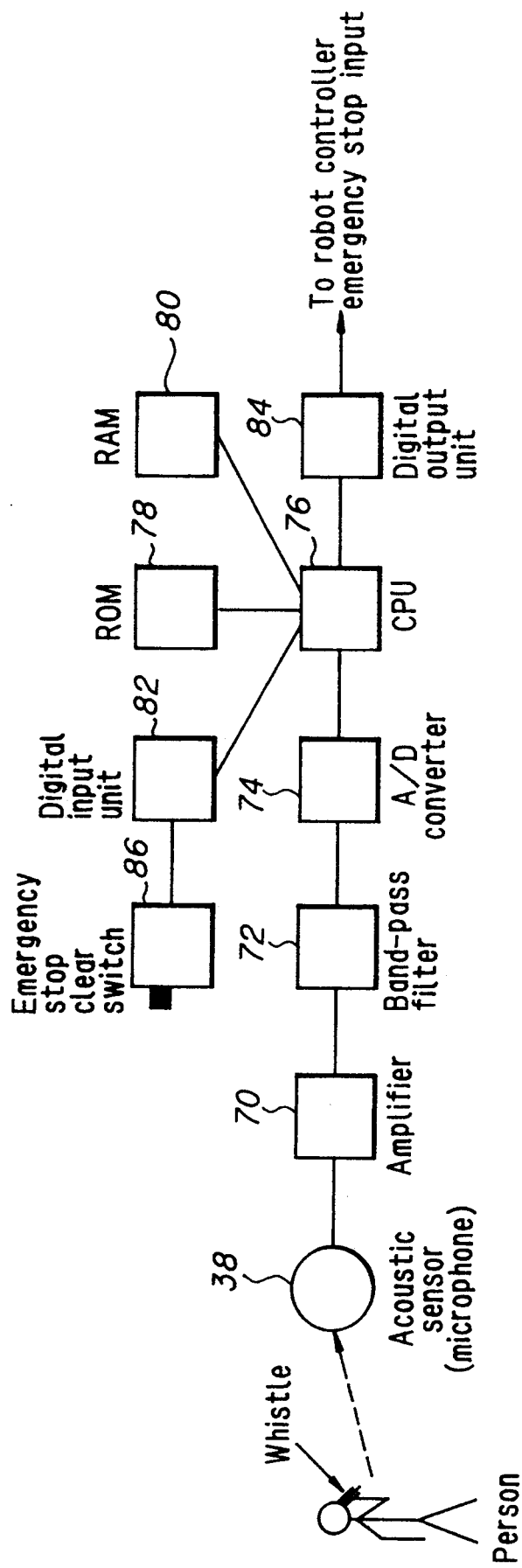
FIG. 3 is a block diagram showing the details of an emergency stop controller illustrated in FIG. 1.

The configuration of the emergency stop controller 30 is shown in the block diagram of FIG. 3. In implementing the control anticipated by the invention, the robot operator and all other personnel working together with the robot are provided with whistles that produce a specific tone (in the vicinity of 400 Hz, for example). When one of the whistles is blown and the resulting sound (audio signal) is picked up by the acoustic sensor 38 for longer than a given time and at higher than a prescribed intensity, an emergency stop operation is conducted.

Figure 4:
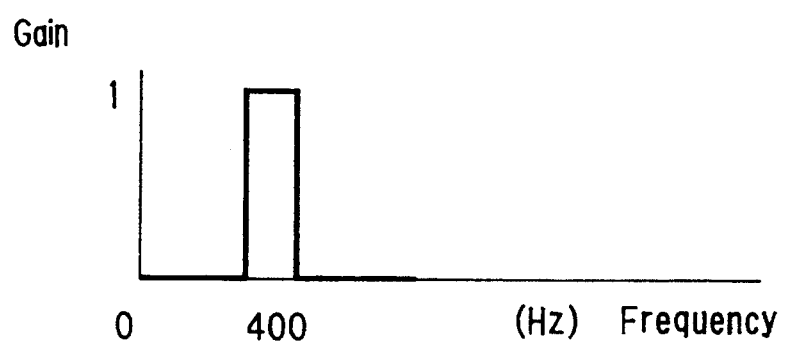
FIG. 4 is a graph showing the frequency characteristics of a band-pass filter illustrated in FIG. 3.

Specifically, the output of the acoustic sensor 38 is amplified by an amplifier 70 and forwarded to a bandpass filter 72 which, having the characteristics shown in FIG. 4, passes only signal components with a frequency around 400 Hz, for example. The output from the bandpass filter 72 is passed through an A/D converter 74 to a microcomputer comprising a CPU 76, a ROM 78, a RAM 80, a digital input unit 82 and a digital output unit 84. When the CPU 76 discriminates that the input is higher than a prescribed level and has continued for longer than a prescribed time period, it outputs an emergency stop signal to the robot controller 26 via the digital output unit 84. The emergency stop signal can be reset by operating an emergency stop clear switch 86 connected with the digital input unit 82 (switch 86 is not shown in FIG. 1).

Figure 5:
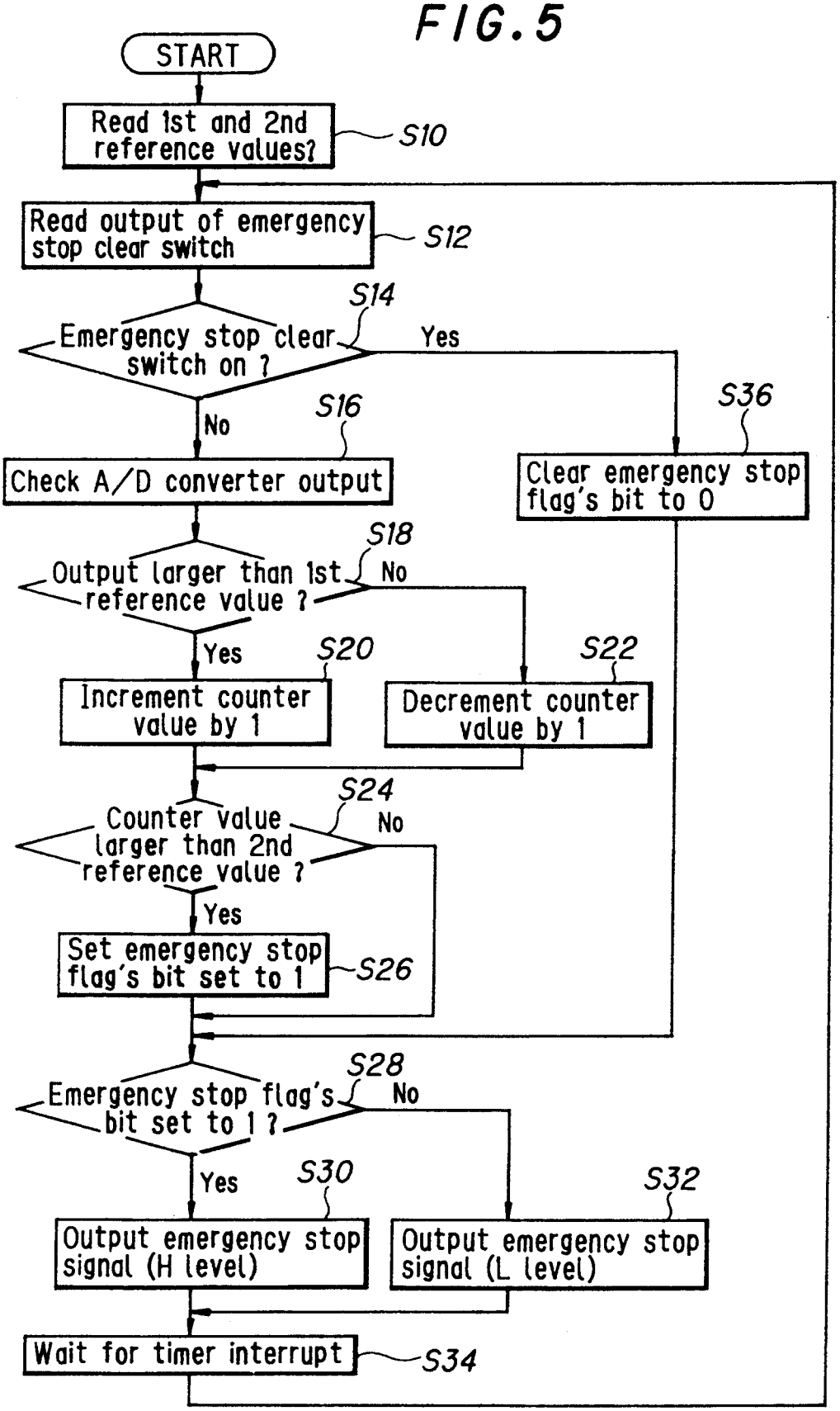
FIG. 5 is a flow chart showing the operation of the emergency stop controller illustrated in FIG. 3.

The operation of the control system will now be explained with reference to a flow chart in FIG. 5. First, in step S10 of this flow chart, first and second reference values (preset values) are read from the ROM 78. Control then passes to step S12 in which the output of the emergency stop clear switch 86 is read and then to step S14 in which a discrimination is made as to whether the switch is on or off. If it is found to be off, control passes to step S16 in which the output of the A/D converter 74 is input, to step S18 in which the input value is compared with the first reference value, and if it is larger than the first reference value to step S20 in which a counter value is incremented, and if it is smaller to step S22 in which the counter value is decremented by 1.

Control then passes to step S24 in which the counter value is compared with the second reference value, and if it is larger, to step S26 in which the bit of an emergency stop flag is set to 1. Control then passes to step S28 in which a discrimination is made as to whether or not the bit of the emergency stop flag is set to 1. If it is, control passes to step S30 in which a high (H) level emergency stop signal is output, and if it is not, control passes to step S32 in which a low (L) level emergency stop signal is output. (The H level signal indicates than an emergency stop is to be executed and the L level signal indicates that an emergency stop is not to be executed.) Control then passes to step S34 in which it waits or a timer interrupt signal, and when the timer interrupt signal is input, returns to step S12, whereafter the foregoing steps are repeated. If it is found in step S14 that the emergency stop clear switch is on, since this means that the emergency stop flag is unnecessary, control passes to step S36 in which the flag bit is reset to 0.

The operation of the robot controller 26 will then be explained with reference to FIG. 6. After the system has been initialized throughout in step S100, control passes to step S102 where it waits for a command, and when the command is input, to step S104 in which a discrimination is made as to whether or not the robot walking is to be conducted. If the result is affirmative, control passes to step S106 in which the destination is input and to step S108 in which a discrimination is made as to whether or not the destination has been reached. If it is found that the destination has not been reached, control passes to step S110 in which the emergency stop signal is read, to step S112 in which a discrimination is made as to whether or not the emergency stop signal is in the H level and thus as to whether or not an emergency stop should be executed, and if it is found that the signal is not in the H level, to step S114 in which walking is commenced. As was explained earlier, walking is achieved by calculating time series target angles for the 12 joints from the predefined walking pattern, and controlling the motors disposed at the respective joints through the servo amplifiers as mentioned earlier.

Figure 7:
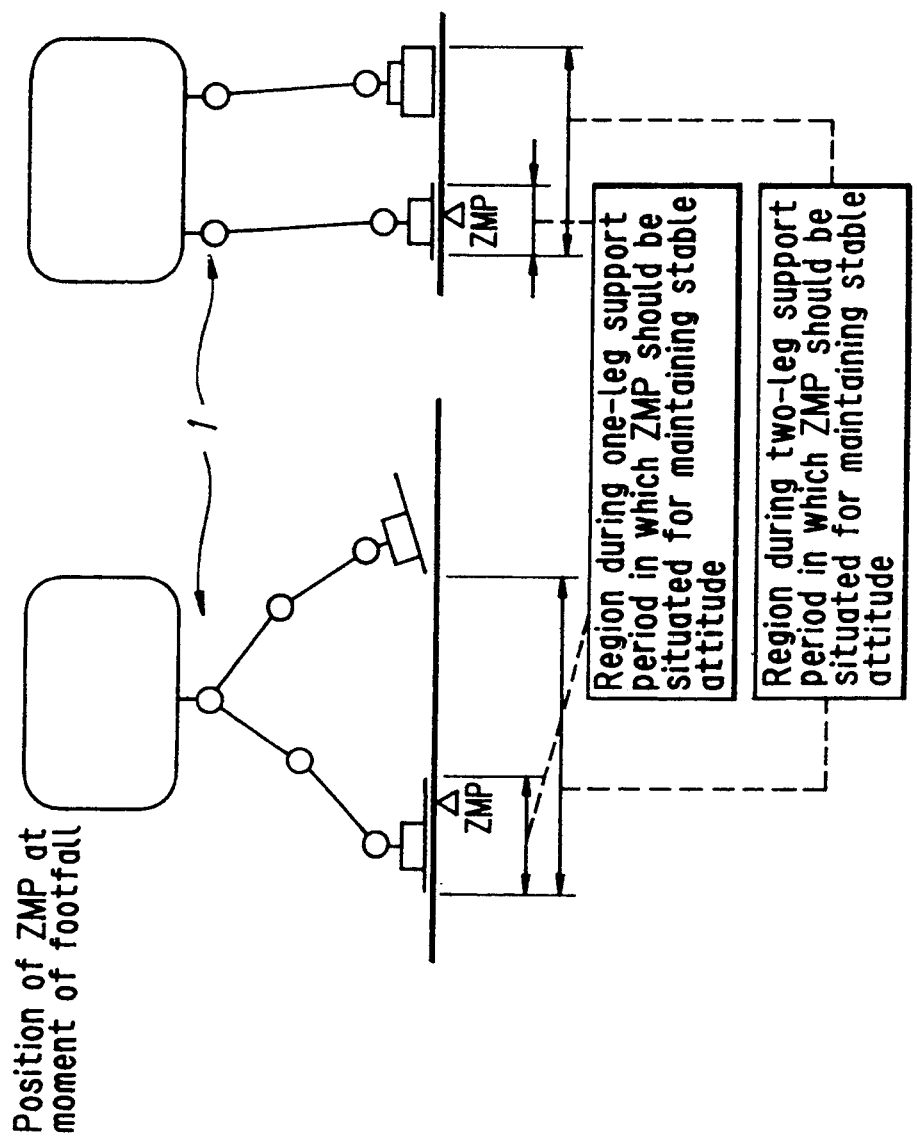
FIG. 7 is a view explaining the position of ZMP at moment of footfall and regions in which the ZMP should be situated for maintaining stable attitude.

If the result in step S112 is that the emergency stop signal is in the H level, control passes to step S116 in which a discrimination is made as to whether or not the robot's attitude is stable. More specifically, when the illustrated biped robot is walking stably, the center of gravity of the robot system has to be positioned within the bottom of the supporting foot if the walking is static. More correctly, in order to maintain a stable attitude, a point at which a perpendicular line drawn from the robot's center of gravity crosses with the ground should be situated within the supporting leg's foot bottom in a static walking. If the walking is dynamic, and if the system utilizes a concept of ZMP (zero moment point; A point on the ground at which the horizontal moments around axes parallel with the ground produced by ground reaction force becomes zero.), for example, control has to be conducted to ensure that the ZMP follows a target trajectory. FIG. 7 shows the position of the ZMP at the moment of footfall and regions in which the ZMP should be situated for stable walking. It will be noted that the regions differ greatly between the one-leg support period and the two-leg support period. When walking is achieved by controlling the ZMP, the robot's attitude has to be controlled such that the resultant force, in the sense of the concentrated load system, of the gravitational and inertial forces (equal to the ground reaction force) fall in the illustrated regions. It can thus be understood from the figure that the attitude of the biped walking robot is particularly unstable during one-leg support period.

Therefore, in step S116 a discrimination is made as to whether or not the robot's center of gravity falls within the bottom of the supporting foot or, in the case of a system utilizing the concept of the ZMP, as to whether or not the ZMP is within the stable regions, whereby it is determined whether or not the robot will be able to maintain its attitude in the stopped state if the emergency stop is executed. If the result of the determination is affirmative, control passes directly to step S118 in which walking or the robot motion is stopped, and if it is negative, control passes to step S120 in which the walking speed is reduced and control is then returned to step S116. Steps 116 and 120 are then repeatedly executed until it is confirmed that a stable attitude has been reached (e.g. that the center of gravity is at the bottom of the supporting foot), and control then passes to step S118. Incidentally, if the result of step S104 is negative, control passes to step S122 in which necessary post processing is conducted.

Owing to the foregoing configuration, this embodiment can reliably bring an intrinsically unstable biped walking robot to an emergency stop when it is found to be likely to collide with a person or object. Since the emergency stop is executed when an acoustic signal of a prescribe frequency is sounded for a prescribed time period, it is safe from unintended execution owing to ambient noise, can be executed by persons other than the operator, and can be executed from remote locations. Thus, not only the robot operator but also other persons within the range of movement of the legged mobile robot are able to bring the robot to an emergency stop, and to do so from a remote location. This is highly preferable from the point of safety.

Figure 6:
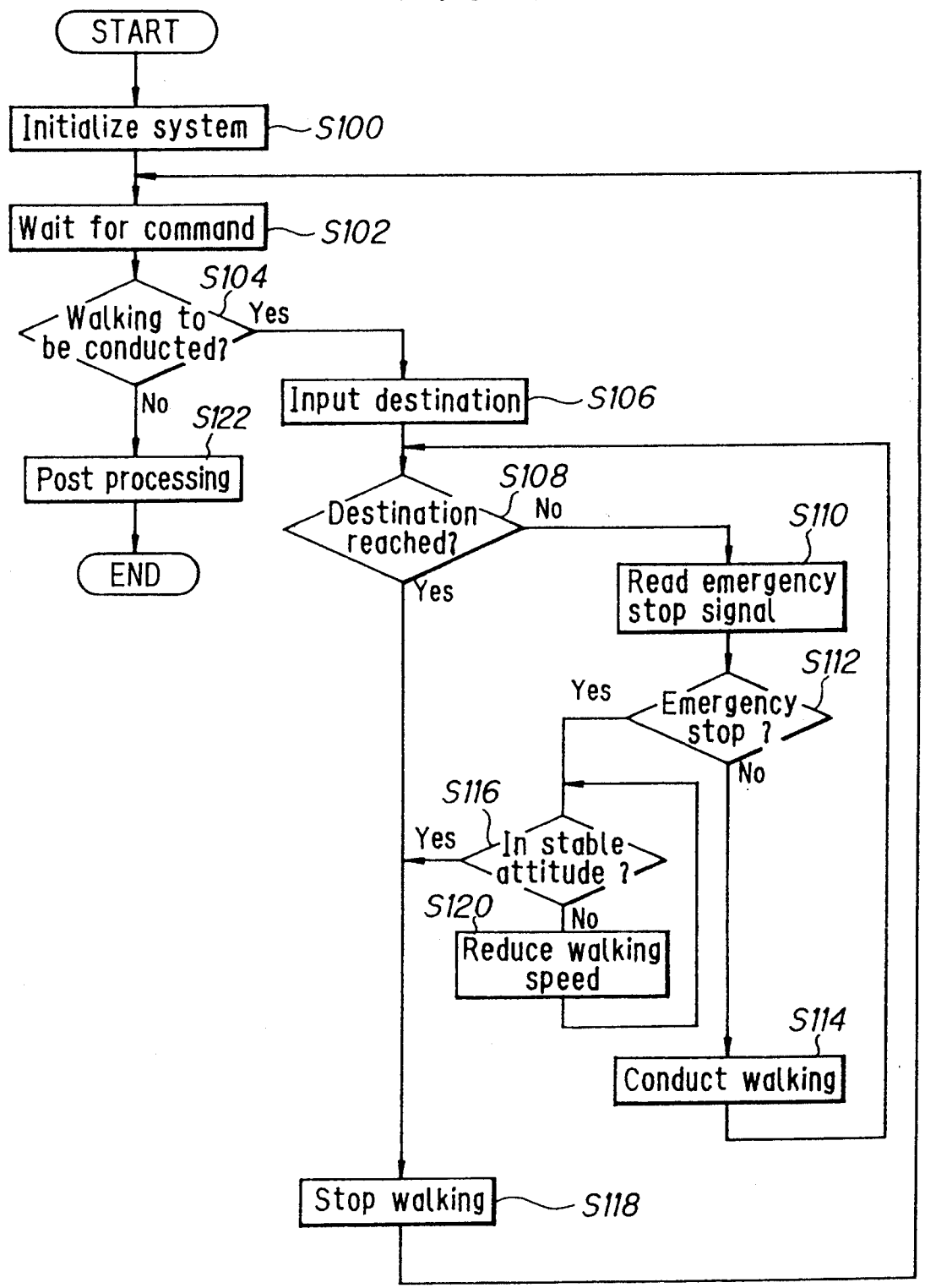
FIG. 6 is a flow chart showing the operation of the robot controller illustrated in FIG. 2.
Figure 8:
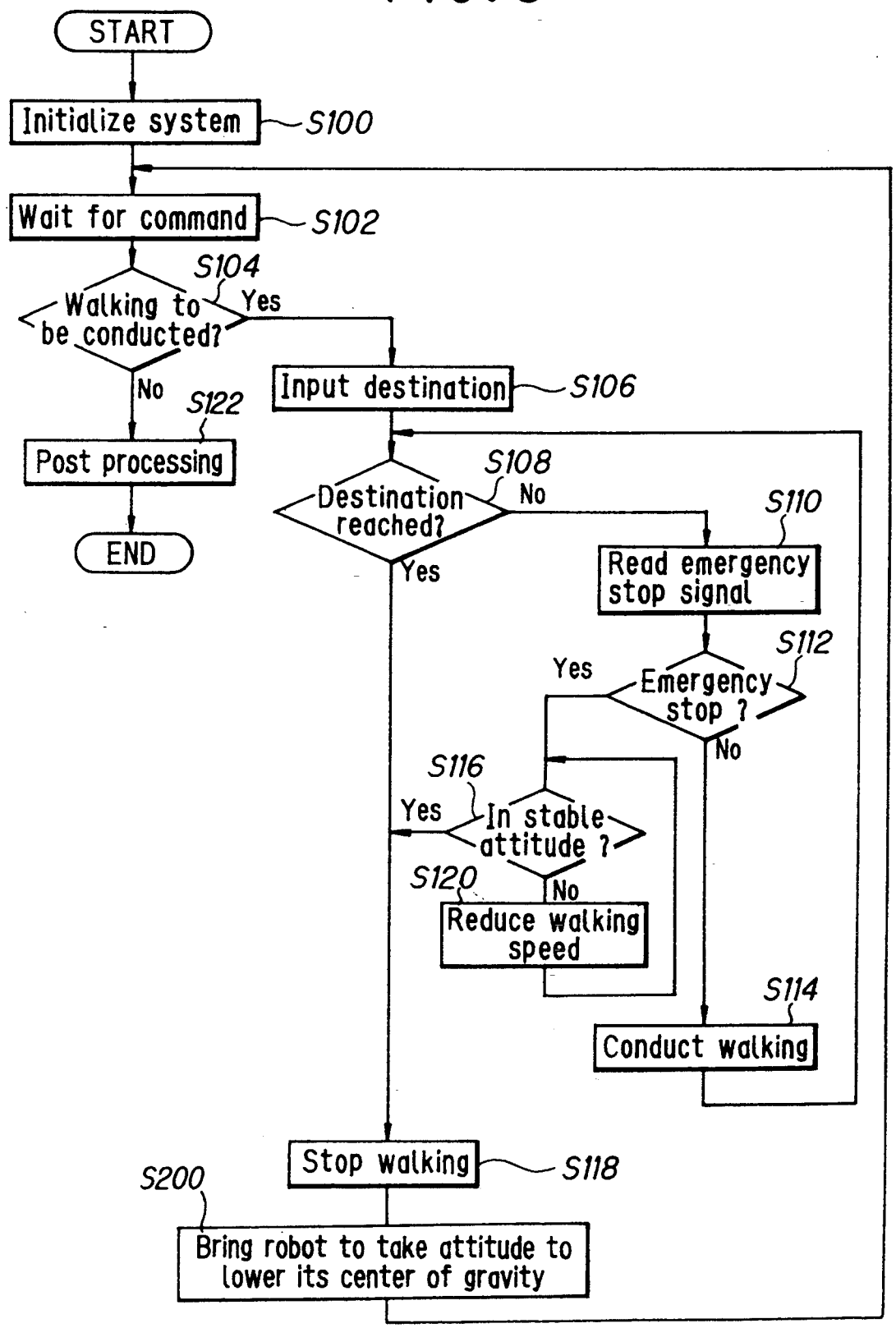
FIG. 8 is a flow chart similar to FIG. 6, but showing an emergency stop control according to a second embodiment of the invention.
Figure 9:
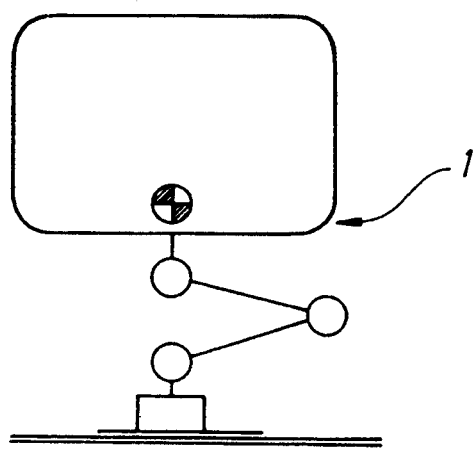
FIG. 9 is a view explaining the operation of the flow chart of FIG. 8 in which the robot is brought to take a squatting attitude such that the robot's center of gravity is lowered.

FIG. 8 is a flow chart similar to that of FIG. 6 showing a second embodiment of the invention. This embodiment differs from the first in that it includes a step S200 following step S118. Step S200 is for putting the robot into an attitude such as squatting so that its center of gravity is lowered as shown in FIG. 9, and thus enhancing its stability following emergency stop. This embodiment thus enables the robot to assume a stable attitude suitable for long-term standby following the emergency stop. The second embodiment is the same as the first in the other aspects of its configuration. Here, it should be noted that the squatting attitude illustrated is an example and any other attitude such as sitting, kneeling or the like will be taken so as to lower the robot's center of gravity.

While the embodiments having the emergency stop controller constituted using microcomputers were described, the invention can also be realized using analog circuitry including amplifiers, filters, schmidt triggers, integrating circuits and the like.

Further, while the invention was described with the robot that walked in accordance with a gait (walking pattern) preestablished, the invention can be applied to a robot which determines a gait real time during walking.

Furthermore, while the invention was described with the biped walking robot, the invention can not only be applied to other legged robot having three legs or more, but also be applied to any other mobile robots other than a legged one.

Moreover, the invention has thus been shown and described with reference to the specific embodiments. However, it should be noted that the invention is in no way limited to the details of the described arrangements, changes and modifications may be made without departing from the scope of the appended claims.

What is claimed is:

1. A system for controlling an emergency stop of a biped mobile robot having two articulated legs for walking, comprising:
   first means for detecting an emergency stop signal generated outside of the robot;
   second means for comparing the detected emergency stop signal with a first reference value to increment a counter value each time the detected emergency stop signal exceeds the first reference value in magnitude; and
   control means for comparing the counter value with a second reference value and for driving the legs of the mobile robot to stop its motion if the counter value exceeds the second reference value.

2. A system according to claim 1, wherein said second means compares the detected emergency stop signal with the first reference value at the prescribed interval and increments the counter value each time the detected emergency stop signal exceeds the first reference value in magnitude while decrementing the counter value each time the detected emergency stop signal does not exceeds the first reference value in magnitude.

3. A system according to claim 1, wherein the emergency stop signal is an acoustic signal.

4. A system according to claim 3, wherein the first reference value is a value determined in terms of frequency.

5. A system according to claim 4, wherein the first reference value is the value determined around 400 Hz or in the proximity thereof.

6. A system according to claim 3, wherein said first means comprises a microphone.

7. A system for controlling an emergency stop of a legged mobile robot having a plurality of legs for walking on the ground, comprising:
   a detector for detecting an emergency stop signal generated outside of the robot;
   a stability sensor for ascertaining if an attitude of the robot is stable or unstable; and
   a controller for driving joints of the robot to stop its motion if the robot attitude is ascertained to be stable when the emergency stop signal is detected and for reducing the walking speed of the robot if the robot attitude is ascertained to be unstable when the emergency stop signal is detected.

8. A system according to claim 7, wherein said stability sensor ascertains if the attitude of the robot is stable by determining whether a point at which a perpendicular line drawn from the robot's center of gravity crosses with the ground is situated within a predetermined region when the robot is in a static walking.

9. A system according to claim 8, wherein the robot has a foot at its distal end of each leg, and the predetermined region is an area defined by the bottom of the foot contacting the ground.

10. A system according to claim 7, wherein said stability sensor ascertains if the attitude of the robot is stable by determining a zero moment point at which the horizontal moments around axes parallel with the ground produced by ground reaction force becomes zero, is at a predetermined trajectory when the robot is controlled such that the ZMP follows the trajectory.

11. A system according to claim 7, wherein the legged mobile robot is a biped robot.

12. A system for controlling an emergency stop of a legged mobile robot having a plurality of articulated legs for walking on the ground, comprising:
- a detector for detecting an emergency stop signal generated outside of the robot;
- an attitude sensor for ascertaining if an attitude of the robot is stable; and
- a controller for driving joints of the robot to cause the robot to stop walking if the robot attitude is ascertained to be stable when the emergency stop signal is detected, and to drive the joints of the robot to lower the center of gravity of the robot.

13. A system according to claim 12, wherein the robot is a biped robot having a body and two articulated legs each connected to the body through a hip joint and each having at least a knee joint and an ankle joint, and said controller drives the hip joints and at least the knee joint and ankle joint such that the robot takes a squatting attitude.

14. A system according to claim 12, wherein said attitude sensor ascertains if the attitude of the robot is stable by determining whether a point at which a perpendicular line drawn from the robot's center of gravity crosses with the ground is situated within a predetermined region when the robot is in a static walking.

15. A system according to claim 14, wherein the robot has a foot at its distal end of each leg, and the predetermined region is an area defined by the bottom of the foot contacting the ground.

16. A system according to claim 12, wherein said attitude sensor ascertains if the attitude of the robot is stable by determining a zero moment point at which the horizontal moments around the axes parallel with the ground produced by ground reaction force becomes zero, is at a predetermined trajectory when the robot is controlled such that the ZMP follows the trajectory.

17. A method for controlling an emergency stop of a legged walking robot, comprising the steps of:
- (a) detecting an emergency stop signal generated external of the robot;
- (b) determining if the robot is in a stable attitude when the emergency stop signal is detected;
- (c) stopping movement of the legs of the robot, if the robot is detected to be in a stable attitude;
- (d) slowing the walking movement of the robot, if the robot is detected to be in an unstable attitude; and
- repeating steps (b), (c) and (d), until the robot is determined to be in a stable attitude and movement of the robot is stopped.

* * * * *